(12) United States Patent
Gould

(10) Patent No.: US 12,392,608 B2
(45) Date of Patent: Aug. 19, 2025

(54) LASER LEVEL WITH INTERNAL ADJUSTABLE PLATFORM

(71) Applicant: Milwaukee Electric Tool Corporation, Brookfield, WI (US)

(72) Inventor: Samuel A. Gould, West Allis, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 405 days.

(21) Appl. No.: 18/151,950

(22) Filed: Jan. 9, 2023

(65) Prior Publication Data

US 2023/0204356 A1 Jun. 29, 2023

Related U.S. Application Data

(63) Continuation of application No. PCT/US2022/082425, filed on Dec. 27, 2022.

(60) Provisional application No. 63/294,612, filed on Dec. 29, 2021.

(51) Int. Cl.
G01C 15/00 (2006.01)

(52) U.S. Cl.
CPC .................. G01C 15/004 (2013.01)

(58) Field of Classification Search
CPC ...................................... G01C 15/004
USPC .......................... 33/290, 291, 299
See application file for complete search history.

(56) References Cited

U.S. PATENT DOCUMENTS

| | | | |
|---|---|---|---|
| 4,854,703 A * | 8/1989 | Ammann | G01C 15/004 356/138 |
| 5,485,266 A * | 1/1996 | Hirano | G01B 11/26 33/291 |
| 6,163,373 A * | 12/2000 | Ohtomo | G01C 15/004 356/147 |
| 6,459,483 B1 | 10/2002 | Shafer et al. | |
| 6,741,343 B2 | 5/2004 | Shafer et al. | |
| 7,039,089 B2 | 5/2006 | Kishi et al. | |
| 7,115,852 B2 | 10/2006 | Ohtomo et al. | |
| 7,339,154 B2 | 3/2008 | Katayama | |
| 7,454,839 B2 | 11/2008 | Della Bona et al. | |
| 7,454,842 B2 * | 11/2008 | Kodaira | G01S 7/4817 33/290 |
| 7,493,699 B2 | 2/2009 | Kishi et al. | |
| 7,724,352 B2 | 5/2010 | Essling | |
| 7,760,369 B2 | 7/2010 | Sehr | |
| 8,132,334 B2 | 3/2012 | Winistoerfer | |

(Continued)

FOREIGN PATENT DOCUMENTS

| | | |
|---|---|---|
| CN | 210070948 | 2/2020 |
| CN | 210978366 | 7/2020 |
| CN | 112815929 | 5/2021 |
| DE | 20015747 | 2/2001 |

(Continued)

OTHER PUBLICATIONS

International Search Report and Written Opinion for International Application No. PCT/US2022/082425, dated May 2, 2023, 9 pages.

*Primary Examiner* — George B Bennett

(74) *Attorney, Agent, or Firm* — Reinhart Boerner Van Deuren s.c.

(57) ABSTRACT

A laser level emits one or more planar lasers that can be self-leveled via one or more internal leveling systems. The motors bias a platform to rotate the laser emitters to a targeted orientation, such as via the motors collectively rotating the laser emitters in response to instructions to rotate with respect to one or more axes.

20 Claims, 6 Drawing Sheets

(56) References Cited

U.S. PATENT DOCUMENTS

| | | |
|---|---|---|
| 8,619,250 B2 | 12/2013 | Hayashi et al. |
| 8,684,632 B2 | 4/2014 | Grover |
| 8,745,884 B2* | 6/2014 | Hayes .................. G01C 15/006 33/1 G |
| 8,806,767 B2 | 8/2014 | Winter et al. |
| 8,857,068 B2* | 10/2014 | Kodaira ............... G01C 15/008 33/290 |
| 8,857,069 B2* | 10/2014 | Adegawa ............... G01C 9/00 33/291 |
| 8,863,396 B2 | 10/2014 | Lukic et al. |
| 8,869,411 B2 | 10/2014 | Lukic et al. |
| 8,919,002 B2* | 12/2014 | Dang .................. G01C 15/004 33/286 |
| 8,959,783 B2* | 2/2015 | Kumagai ............. G01C 15/002 33/291 |
| 9,188,441 B2 | 11/2015 | Munroe et al. |
| 9,200,900 B2* | 12/2015 | Fessler ................ G01C 15/004 |
| 9,222,772 B2 | 12/2015 | Munroe et al. |
| 9,273,958 B2 | 3/2016 | Gros et al. |
| 9,360,317 B2 | 6/2016 | Munroe et al. |
| 9,499,953 B2 | 11/2016 | Grover |
| 9,702,739 B2 | 7/2017 | Lukic et al. |
| 10,006,766 B2 | 6/2018 | Hinderling et al. |
| 10,006,768 B2 | 6/2018 | Spaulding |
| 10,011,969 B2 | 7/2018 | Grover |
| 10,066,935 B2 | 9/2018 | Schumacher et al. |
| 10,066,939 B2 | 9/2018 | Lee et al. |
| 10,352,736 B2 | 7/2019 | Lukic et al. |
| 10,352,737 B2 | 7/2019 | Lukic et al. |
| 10,466,049 B2 | 11/2019 | Lee et al. |
| 10,684,129 B2 | 6/2020 | Lukic et al. |
| 10,823,565 B2 | 11/2020 | Winter et al. |
| 11,119,202 B2 | 9/2021 | Shi et al. |
| 2004/0007563 A1 | 1/2004 | Hastings |
| 2007/0029289 A1 | 2/2007 | Brown |
| 2007/0030865 A1 | 2/2007 | Day et al. |
| 2007/0270258 A1 | 11/2007 | Stanescu |
| 2009/0126209 A1* | 5/2009 | Tsai ...................... G01C 15/00 33/227 |
| 2010/0313433 A1* | 12/2010 | Hayashi ............... G01C 15/004 33/291 |
| 2013/0162971 A1 | 6/2013 | Winter et al. |
| 2015/0331159 A1* | 11/2015 | Bridges ................. G02B 5/12 359/515 |
| 2016/0202056 A1 | 7/2016 | Senger |
| 2018/0340771 A1 | 11/2018 | Schumacher et al. |
| 2020/0033123 A1 | 1/2020 | Lee et al. |
| 2020/0240783 A1 | 7/2020 | Eidinger et al. |
| 2023/0045402 A1* | 2/2023 | Pohlmann ........... G01C 15/008 |
| 2023/0115417 A1* | 4/2023 | Caelwaerts ......... G01C 15/004 310/48 |
| 2023/0119676 A1* | 4/2023 | Roudebush .......... G01C 15/105 33/228 |
| 2024/0159532 A1* | 5/2024 | Gould ................. G01C 15/105 |

FOREIGN PATENT DOCUMENTS

| | | |
|---|---|---|
| DE | 102010061726 | 5/2012 |
| EP | 3173741 | 5/2017 |
| EP | 2938962 | 3/2018 |
| JP | 2019-086362 | 6/2019 |
| WO | WO16105550 | 6/2016 |

* cited by examiner

LASER LEVEL WITH INTERNAL ADJUSTABLE PLATFORM

CROSS-REFERENCE TO RELATED PATENT APPLICATION

The present application is a continuation of International Application No. PCT/US2022/082425, filed on Dec. 27, 2022, which claims the benefit of and priority to U.S. Provisional Application No. 63/294,612, filed on Dec. 29, 2021, which is incorporated herein by reference in its entirety.

BACKGROUND OF THE INVENTION

The present disclosure is directed generally to laser levels. The present disclosure relates specifically to point line plane laser levels.

SUMMARY OF THE INVENTION

One embodiment of the invention relates to a laser generating device including a housing, an arm pivotally coupled to the housing, a platform coupled to the arm, a first laser emitting device coupled to the platform, a second laser emitting device coupled to the platform, a first motor configured to exert a first force on the platform along a first axis, and a second motor configured to exert a second force on the platform along a second axis distinct from the first axis. The platform is configured to be rotated with respect to the housing about both a first rotational axis and a second rotational axis distinct from the first rotational axis. The first laser emitting device is operable to generate a first output beam along a first plane. The second laser emitting device is operable to generate a second output beam along a second plane. Both the first motor and the second motor are activated to exert force on the platform when the platform is rotated with respect to the housing about the first rotational axis, and both the first motor and the second motor are activated to exert force on the platform when the laser generating device rotates the platform with respect to the housing about the second rotational axis.

Another embodiment of the invention relates to a laser generating device including a housing, an arm pivotally coupled to the housing, a platform coupled to the arm, a first laser emitting device coupled to the platform, a second laser emitting device coupled to the platform, and a first motor configured to exert a first force on the platform along a first axis. The platform is configured to be rotated with respect to the housing about both a first rotational axis and a second rotational axis distinct from the first rotational axis. The first laser emitting device is operable to generate a first output beam along a first plane. The second laser emitting device is operable to generate a second output beam along a second plane. The first motor is configured to exert a first force on the platform along a first axis. Rotating the platform with respect to the housing around the first rotational axis includes the first motor exerting a force on the platform in a first direction along the first axis, and rotating the platform with respect to the housing around the second rotational axis includes the first motor exerting a force on the platform in a second direction along the first axis opposite the first direction.

Another embodiment of the invention relates to a laser generating device including a housing, an arm pivotally coupled to the housing, a base coupled to the arm such that the base rotates with respect to the housing about both a first rotational axis and a second rotational axis distinct from the first rotational axis, a platform coupled to the base, a first laser emitting device coupled to the platform, the first laser emitting device operable to generate a first output beam along a first plane, and a second laser emitting device, the second laser emitting device operable to generate a second output beam along a second plane. The base includes a first protrusion and a second protrusion. The platform is rotatable with respect to the base about a third rotational axis. The first rotational axis extends parallel to an X-axis in a Cartesian Coordinate System, the second rotational axis extends parallel to an Y-axis in the Cartesian Coordinate System, and the third rotational axis extends parallel to a Z-axis in the Cartesian Coordinate System. The platform includes an interior recessed surface and an opposing exterior recessed surface. When the platform is rotating with respect to the base about the first rotational axis the interior recessed surface interfaces with and moves with respect to the first protrusion and the exterior recessed surface interfaces with and moves with respect to the second protrusion.

Another embodiment of the invention relates to a laser generating device. The laser generating device includes a housing, an arm pivotally coupled to the housing, and a platform coupled to the arm. The platform is configured to be rotated with respect to the housing about a first rotational axis and a second rotational axis perpendicular to the first rotational axis. The laser generating device further includes a first laser emitting device coupled to the platform, the first laser emitting device operable to generate a first output beam along a first plane, and a second laser emitting device coupled to the platform, the second laser emitting device operable to generate a second output beam along a second plane. The laser generating device further includes a first motor configured to exert a first force on the platform along a third axis, and a second motor configured to exert a second force on the platform along a fourth axis distinct from the third axis. Rotating the platform with respect to the housing around the first rotational axis includes the first motor exerting a force on the platform in a first direction along the third axis and the second motor exerting a force on the platform in a second direction along the fourth axis. Rotating the platform with respect to the housing around the second rotational axis includes the first motor exerting a force on the platform in the first direction along the third axis and the second motor exerting a force on the platform in a third direction opposite the second direction.

Another embodiment of the invention relates to a laser generating device. The laser generating device includes a housing, an arm pivotally coupled to the housing, a plate coupled to the arm, the plate including a first protrusion and a second protrusion. The laser generating device further includes a first laser emitting device, the first laser emitting device operable to generate a first output beam along a first plane, and a second laser emitting device, the second laser emitting device operable to generate a second output beam along a second plane. The laser generating device further includes a platform coupled to the plate, the first laser emitting device and the second laser emitting device. The platform is configured to be rotated with respect to the plate and the arm about a first rotational axis. The platform includes an interior surface and an opposing peripheral surface. The interior surface is configured to interface with the first protrusion and the peripheral surface is configured to interface with the second protrusion when the platform is rotating with respect to the plate about the first rotational axis.

In various embodiments, the interior surface includes a first central recessed portion that extends along a length of the interior surface, and the peripheral surface includes a second central recessed portion that extends along a length of the peripheral surface.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
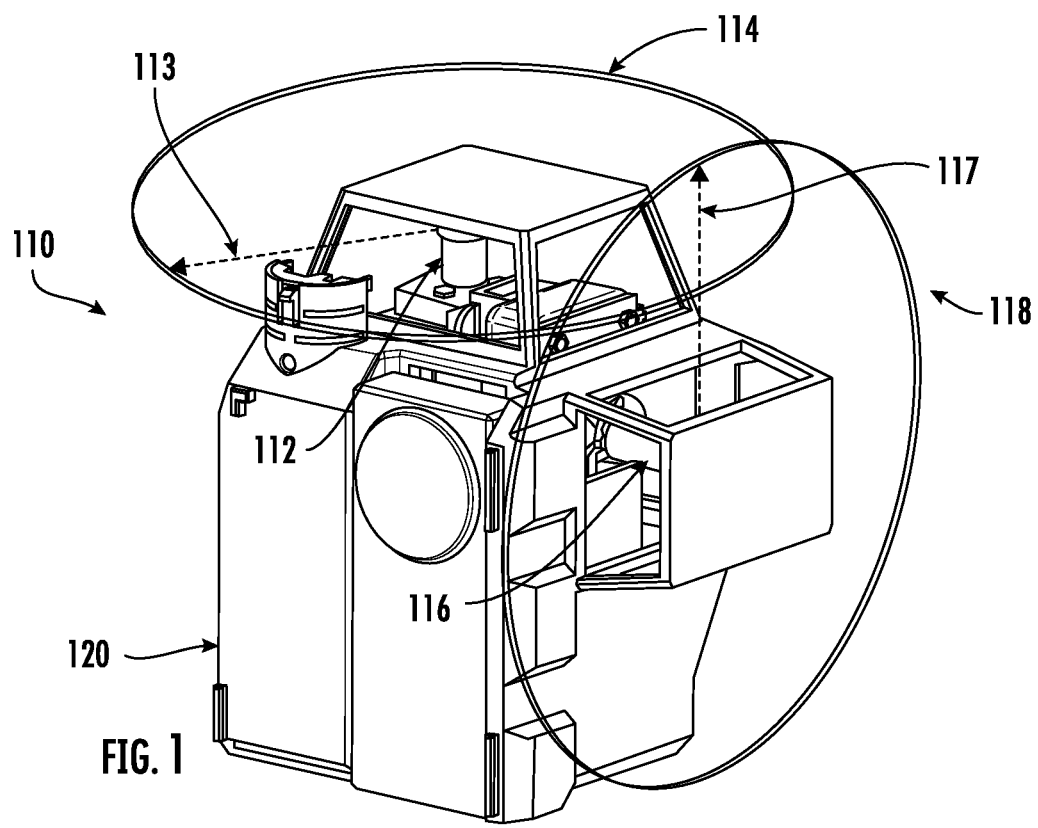
FIG. 1 is a perspective view of a laser level, according to an exemplary embodiment.

Referring generally to the figures, a laser level is provided, such as a point line and plane laser level. As will generally be understood, laser level systems, including laser emitters and laser targets, are used to align objects or features in an area (e.g., such as holes along a wall, pipe, conduit, etc.).

In various embodiments, the laser level described herein is configured to be precisely adjusted along two or more distinct axes. In one embodiment, the laser level includes a housing that emits one or more planar beams of light. The laser emitters are coupled to a platform, which is pivotally coupled to the housing. The platform is configured to be adjusted along multiple axes via two motors or more cooperatively rotating the platform with respect to the housing.

Applicant has observed that the internal configuration described herein provides a more compact structure to provide a self-leveling laser level compared to other laser level internal configurations. In various embodiments, at least two motors rotate a platform coupled to laser emitters via such each motor affects orientation of the platform with respect to more than one axis, which is in contrast to laser levels where each motor is responsible for adjusting a single axis.

Referring to FIGS. 1-4, a laser emitter and/or laser beam generating device, shown as laser level 110, is shown. Laser level 110 includes housing 120, an arm 121 pivotally coupled to the housing 120, a platform 122 coupled to the arm 121 (e.g., rigidly coupled to the arm 121), a first light generator coupled to platform 122, shown as laser emitter 112 that is operable to generate output beam 113 along plane 114, and a second laser light generator coupled to platform 122, shown as laser emitter 116 that is operable to generate output beam 117 along plane 118. In various embodiments, plane 114 is perpendicular to plane 118.

Laser level 110 includes one or more orientation measuring devices, shown as electronic bubble vials. In various embodiments, laser level 110 includes electronic bubble vial 192, electronic bubble vial 194, and electronic bubble vial 196. Laser level 110 receives signals from electronic bubble vial 192, electronic bubble vial 194, and/or electronic bubble vial 196 and based on those signals laser level 110 orients laser emitter 112 and laser emitter 116 to a targeted orientation.

Figure 2:
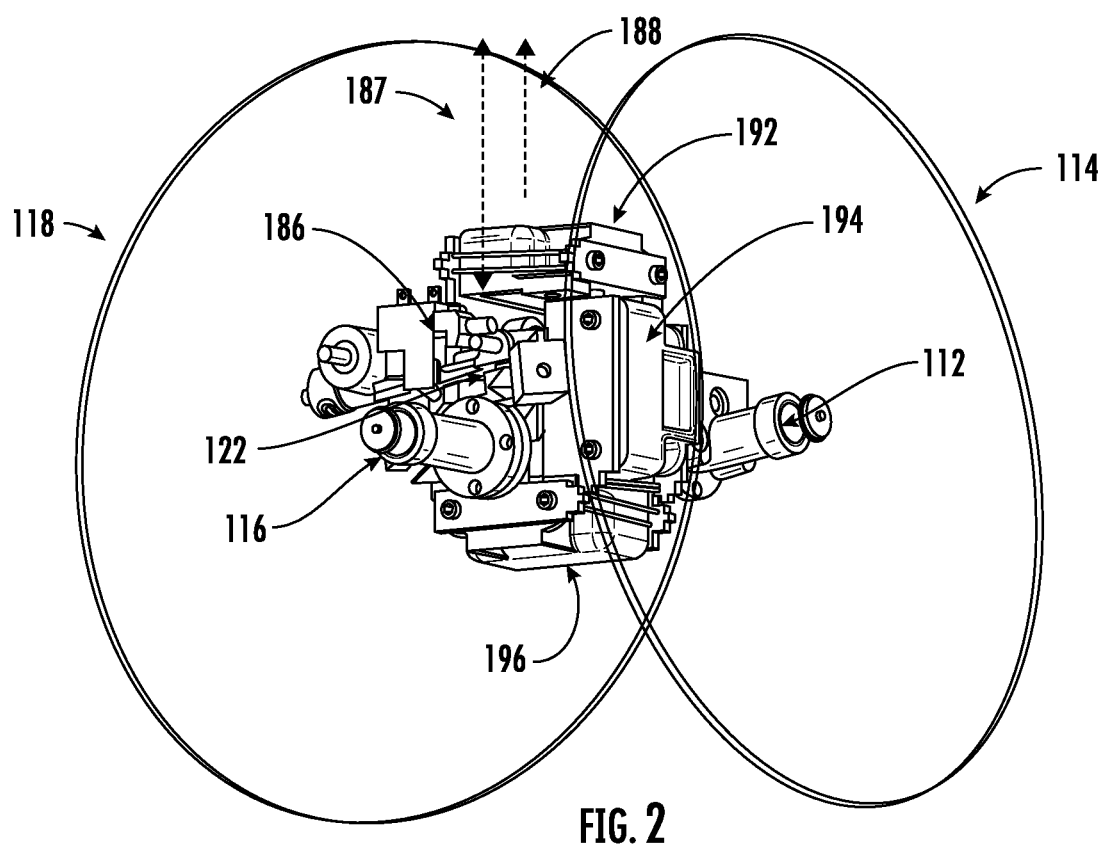
FIG. 2 is a perspective view of an interior of the laser level of FIG. 1, according to an exemplary embodiment.

Referring to FIG. 2, laser level 110 includes motor 186 that adjusts the orientation of laser emitter 112 and laser emitter 116. In particular, motor 186 exerts a force along axis 187 on platform 122 coupled to laser emitter 112 and laser emitter 116. In various embodiments, axis 183 is distinct from axis 187 (e.g., axis 183 and axis 187 are not aligned). In various embodiments, axis 183 and axis 187 are parallel to each other. As will be explained, motor 186 exerting a force along axis 187, such as in direction 188, rotates laser emitter 112 and laser emitter 116 with respect to housing 120.

Figure 3:
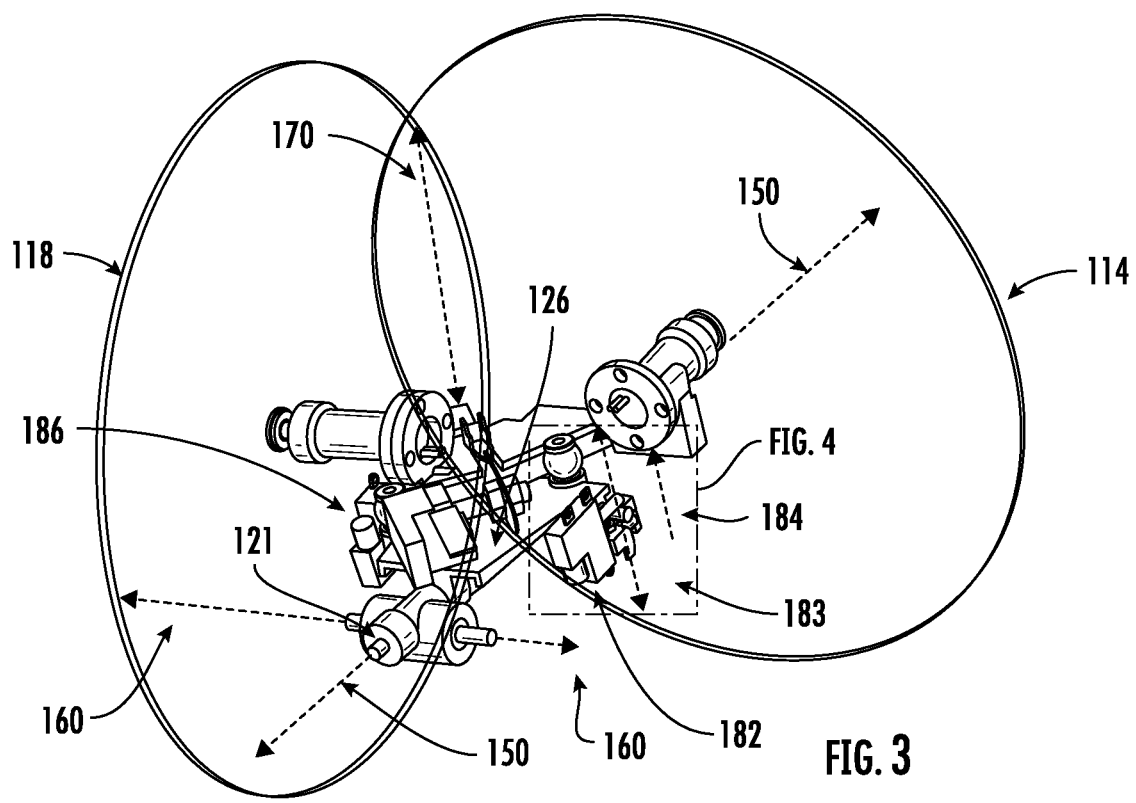
FIG. 3 is a perspective view of an interior of the laser level of FIG. 1 from the opposite perspective of FIG. 2, according to an exemplary embodiment.

Referring to FIG. 3, laser level 110 is configured to rotate platform 122, laser emitter 112, and laser emitter 116 along one or more axes. In particular, laser level 110 is configured to rotate platform 122 with respect to housing 120 about rotational axis 150, rotational axis 160, and rotational axis 170. In various embodiments, laser emitter 112 and laser emitter 116 are coupled to arm 121 via platform 122 and arm 121 is pivotally coupled to housing 120. The rotation of platform 122 to adjust laser emitter 112 and laser emitter 116 also rotates arm 121 with respect to housing 120.

Platform 122 is configured to be rotated with respect to the housing 120 about both rotational axis 150 and rotational axis 160, which is distinct from rotational axis 150 (e.g., rotational axis 150 and rotational axis 160 are not aligned with each other). In various embodiments, rotational axis 150 and rotational axis 160 are not planar with respect to each other (e.g., rotational axis 150 and rotational axis 160 are skew with respect to each other; stated another way, no plane exists that encompasses each of rotational axis 150 and rotational axis 160) and thus do not intersect.

Figure 4:
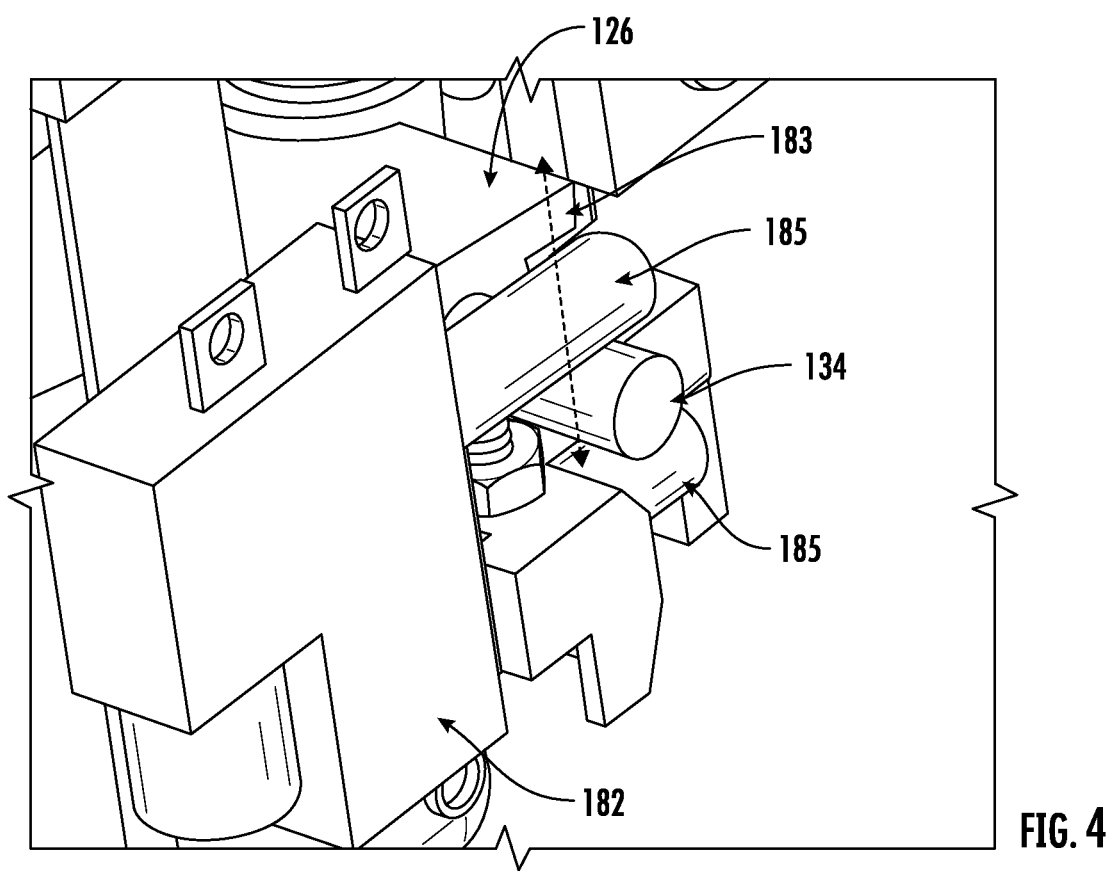
FIG. 4 is a detailed perspective view of an interior of the laser level of FIG. 1, according to an exemplary embodiment.

Referring to FIGS. 3-4, laser level 110 includes motor 182 (e.g., coupled to housing 120) that adjusts the orientation of laser emitter 112 and laser emitter 116. In particular, motor 182 exerts a force on platform 122 along axis 183. As will be explained, motor 182 exerting a force along axis 183, such as in direction 184, rotates laser emitter 112 and laser emitter 116 with respect to housing 120.

In various embodiments, laser emitter 112 and laser emitter 116 are coupled to platform 122, such as fixedly coupled. Platform 122 is coupled to base 126, such as pivotally coupled to plate, and base 126 is coupled to arm 121 such that base 126 rotates with respect to housing 120 about both rotational axis 150 and rotational 160 axis distinct from rotational axis 150. Motor 182 exerts a force on platform 122 via pins 185 of motor 182 exerting a force to pin 134 extending from base 126 (FIG. 4).

In various embodiments, laser level 110 includes base 126, the platform 122 coupled to the arm 121 via the base 126 (e.g., platform 122 is coupled to base 126, and base 126 is coupled to arm 121), and the base 126 and the platform 122 are collectively configured to be rotated with respect to the housing 120 about both rotational axis 150 and rotational axis 160. The platform 122 rotates with respect to base 126 about rotational axis 170. In various embodiments, rotational axis 150 extends parallel to an X-axis in a Cartesian Coordinate System, rotational axis 160 extends parallel to an Y-axis in the (same) Cartesian Coordinate System, and rotational axis 170 extends parallel to a Z-axis in the (same) Cartesian Coordinate System. Stated another way, in various embodiments, rotational axis 150 is perpendicular to rotational axis 160 when viewed along rotational axis 170, rotational axis 150 is perpendicular to rotational axis 170 when viewed along rotational axis 160, and rotational axis 160 is perpendicular to rotational axis 170 when viewed along rotational axis 150. In various embodiments, plane 114 and plane 118 each include the entire rotational axis 170 (e.g., rotational axis 170 extends entirely within plane 114, and rotational axis 170 extends entirely within plane 118).

Figure 5:
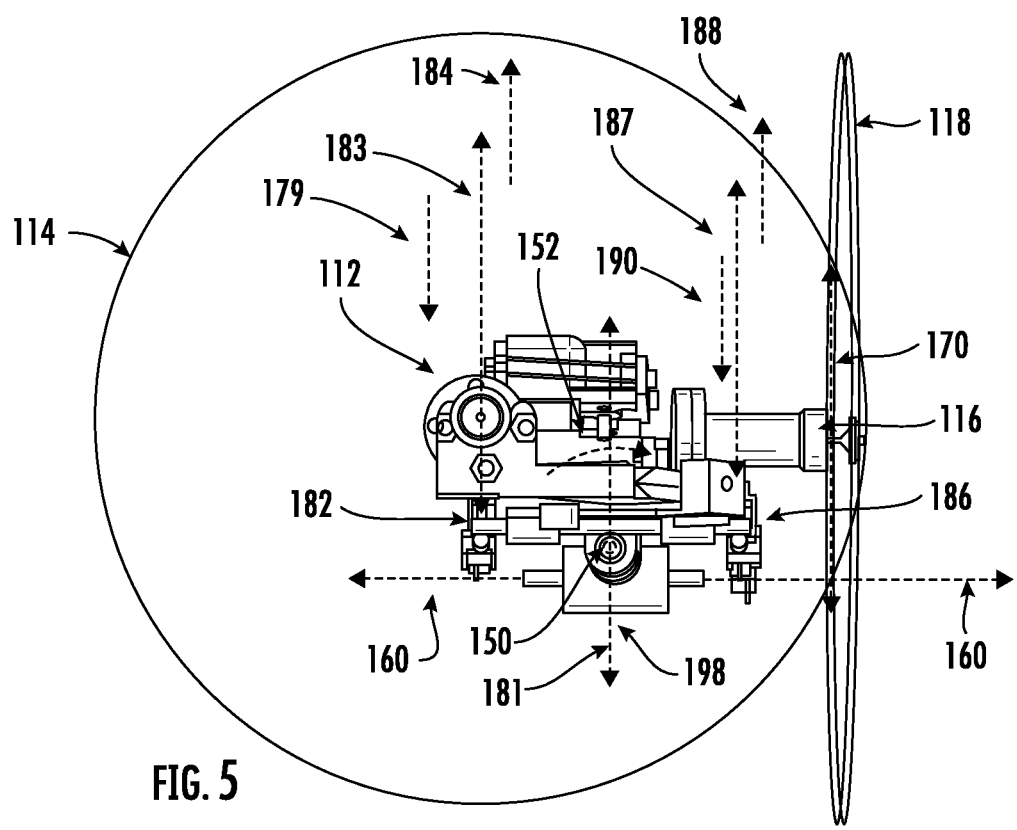
FIG. 5 is a front view of an interior of the laser level of FIG. 1, according to an exemplary embodiment.
Figure 6:
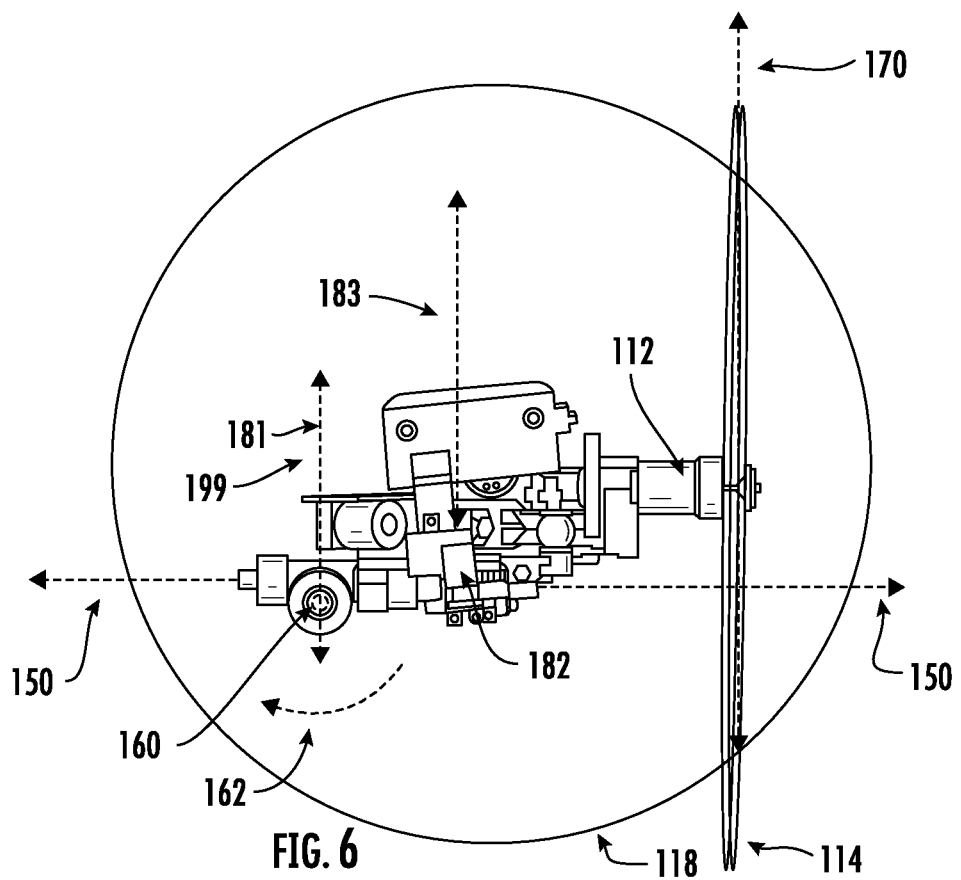
FIG. 6 is a side view of an interior of the laser level of FIG. 1, according to an exemplary embodiment.

Referring to FIGS. 5-6, motor 182 and motor 186 are configured to cooperatively rotate laser emitter 112 and laser emitter 116 with respect to housing 120. In various embodiments, rotating platform 122, laser emitter 112, and laser emitter 116 with respect to the housing 120 around rotational axis 150 includes motor 182 exerting a force on platform 122 in a first direction 184 along axis 183, and rotating platform 122, laser emitter 112, and laser emitter 116 with respect to housing 120 around rotational axis 160 includes motor 182 exerting a force on platform 122 in a second direction 179 along axis 183 opposite the first direction 184. In various embodiments, rotating platform 122, laser emitter 112, and laser emitter 116 with respect to housing 120 around rotational axis 150 includes motor 186 exerting a force on platform 122 in direction 188 along axis 187, and rotating platform 122 with respect to housing 120 around rotational axis 160 includes motor 186 exerting a force on platform 122 in the third direction 188 along axis 187. It will be understood that to rotate platform 122 in the opposite directions to those described herein, motor 182 and motor 186 will each exert a force in the opposite direction along their respective axis 183, 187.

In various embodiments, both motor 182 and motor 186 are activated to exert force on platform 122 (e.g., to change a position and/or orientation of platform 122) when laser generating device 110 rotates platform 122 with respect to housing 120 about the first rotational axis 150, and both motor 182 and motor 186 are activated to exert force on platform 122 (e.g., to change a position and/or orientation of platform 122) when laser generating device 110 rotates platform 122 with respect to housing 120 about rotational axis 160.

Stated another way, motor 182 and motor 186 exert forces on platform 122 in opposing directions (e.g., one up and one down, from the perspective of FIG. 5) to rotate platform 122 about rotational axis 150 with respect to housing 120. As will be explained, this is in contrast to how motor 182 and motor 186 operate when rotating platform 122 about rotational axis 160 with respect to housing 120.

In particular, to rotate laser emitter 112 and laser emitter 116 in direction 162 around rotational axis 160, motor 182 exerts a force on platform 122 in direction 179 opposite direction 184 along axis 183 (e.g., down from the perspective of FIGS. 5-6) and motor 186 exerts a force on platform 122 in direction 190 opposite direction 188 along axis 187 (e.g., down from the perspective of FIGS. 5-6). Stated another way, motor 182 and motor 186 exert forces on platform 122 in the same directions (e.g., both up or both down, from the perspective of FIG. 5) to rotate platform 122 about rotational axis 160 with respect to housing 120. Thus, motor 182 and motor 186 cooperatively rotate platform 122 with respect to housing 120 about each of rotational axis 150 and rotational axis 160.

In various embodiments, laser level 110 is configured to be placed on a surface, such as a floor, in multiple configurations. For example, (a) laser level 110 is configured to be placed on a surface such that plane 114 is perpendicular to gravity, (b) laser level 110 is configured to be placed on a surface such that plane 118 is perpendicular to gravity, (c) laser level 110 is configured to be placed on a surface such that neither plane 114 nor plane 118 is perpendicular to gravity (e.g., plane 114 and plane 118 are parallel to gravity).

Referring to FIGS. 5-6, in various embodiments, the first motor 182 and the second motor 186 are coupled to the platform 122 such that an intersecting axis 181 intersects each of the first rotational axis 150 and the second rotational axis 160 and the intersecting axis 181 is perpendicular to each of the first rotational axis 150 and the second rotational axis 160, and the rotational axis 150 and rotational axis 160 are perpendicular to each other when viewed from a perspective along the intersecting axis 181. Stated another way, rotational axis 150 and rotational axis 160 define an intersecting axis 181 that intersects each of rotational axis 150 and rotational axis 160 and that is perpendicular to each of rotational axis 150 and rotational axis 160. In various embodiments, rotational axis 150 and rotational axis 160 are perpendicular to each other when viewed from a perspective along the intersecting axis 181 (e.g., if a user travels up axis 181 from the perspective of FIG. 5, and subsequently the user looked back along axis 181, rotational axis 150 and rotational axis 160 would appear perpendicular to each other). In various embodiments, axis 181 is parallel to plane 114. In various embodiments, axis 181 is parallel to plane 118. In various embodiments, axis 181 is parallel to plane 114 and plane 118.

Stated another way, rotational axis 150 and rotational axis 160 each reside in planes (e.g., horizontal planes) that are parallel to each other and that are each perpendicular to intersecting axis 181. For example, rotational axis 160 resides in a plane projecting through the page of FIG. 5 at rotational axis 160, and rotational axis 150 resides in a plane projecting through the page of FIG. 6 at rotational axis 150. The projection of rotational axis 150 onto the respective plane of rotational axis 160 is perpendicular to rotational axis 160, and the projection of rotational axis 160 onto the respective plane of rotational axis 150 is perpendicular to rotational axis 150.

Stated yet another way, intersecting axis 181 extends along the shortest possible path between rotational axis 150 and rotational axis 160. Further, intersecting axis 181 and rotational axis 150 define a first plane 198 (FIG. 5) that is perpendicular to rotational axis 160 (e.g., a vertical plane projecting through the page of FIG. 5 at intersecting axis 181), and intersecting axis 181 and rotational axis 160 define a second plane 199 (FIG. 6) that is perpendicular to rotational axis 150 (e.g., a vertical plane projecting through the page of FIG. 6 at intersecting axis 181).

Figure 7:
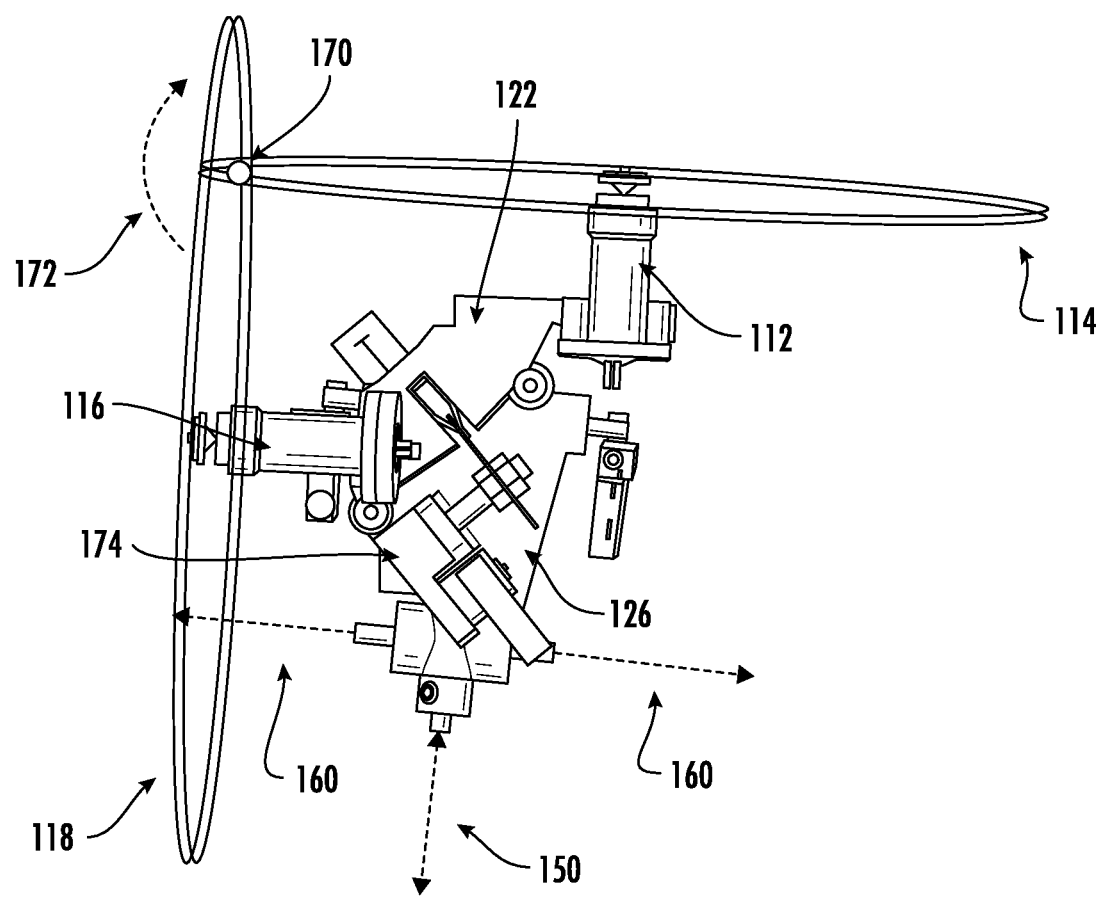
FIG. 7 is a top view of an interior of the laser level of FIG. 1, according to an exemplary embodiment.
Figure 8:
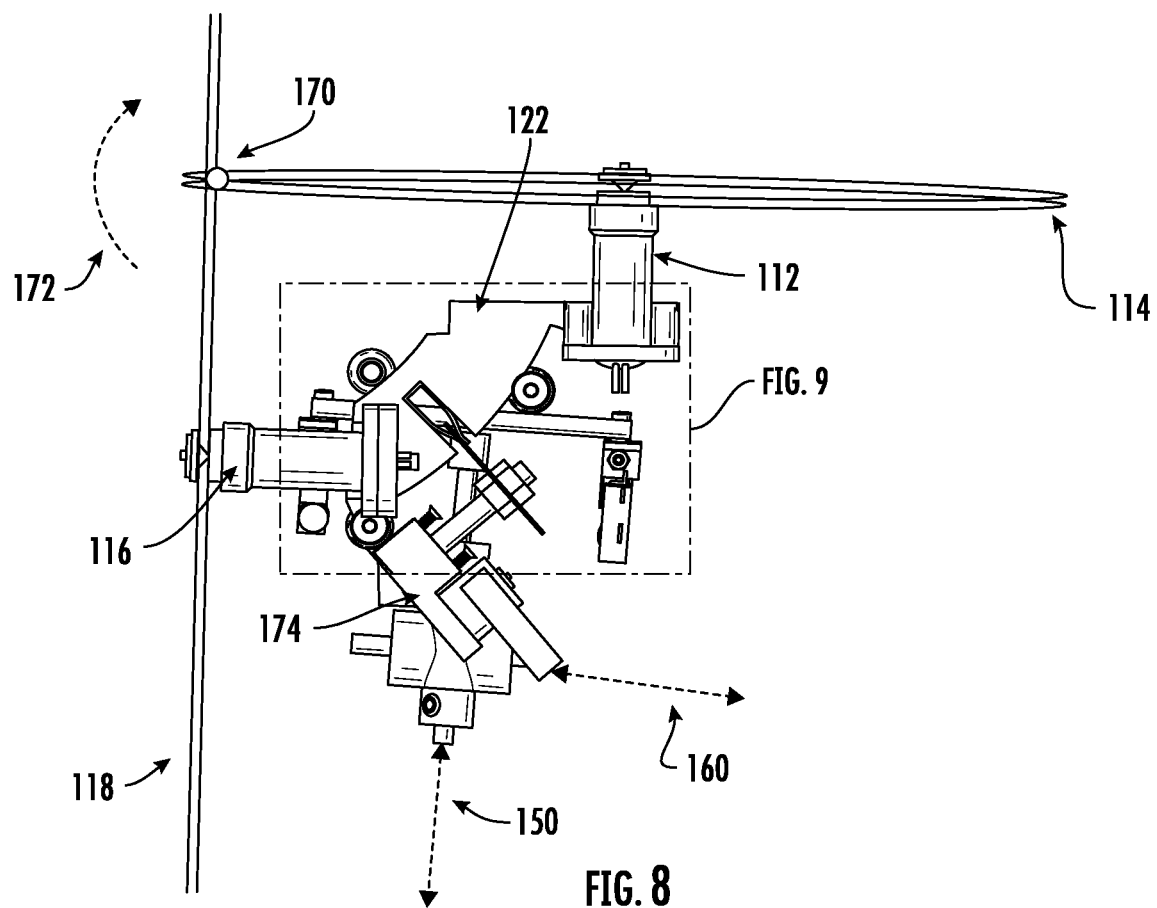
FIG. 8 is a top view of an interior of the laser level of FIG. 1, according to an exemplary embodiment.
Figure 9:
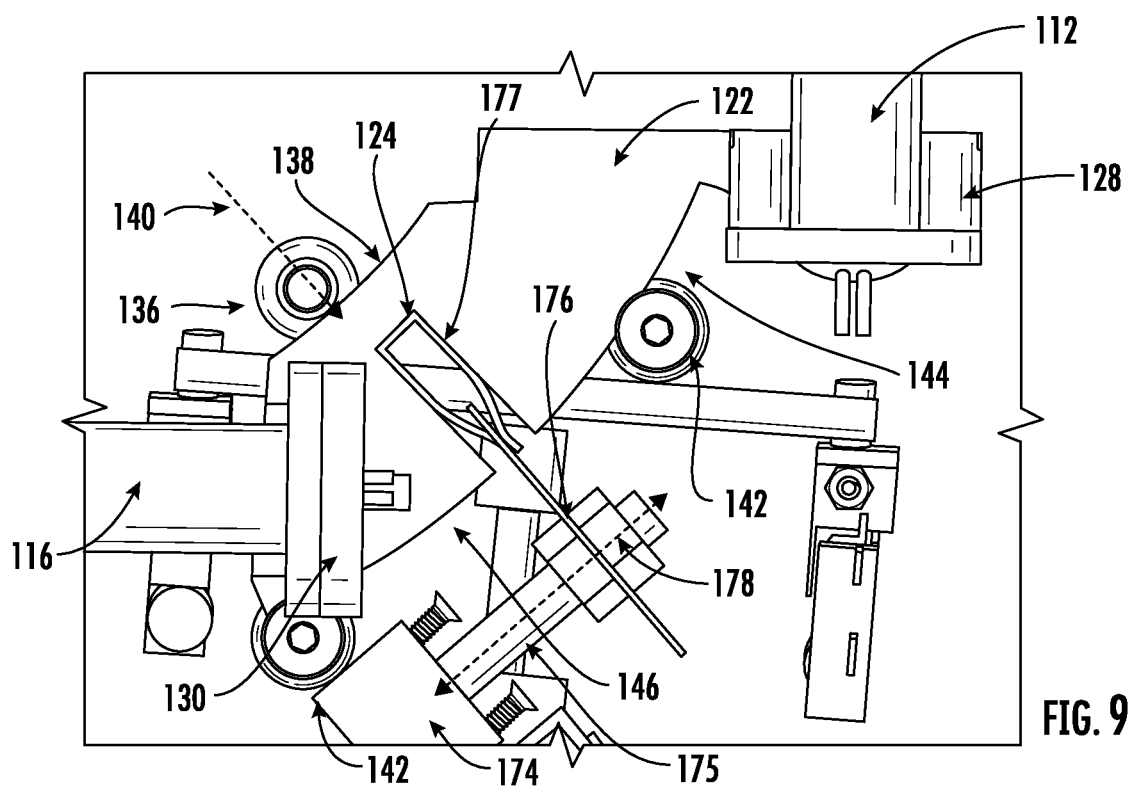
FIG. 9 is a detailed top view of an interior of the laser level of FIG. 1, according to an exemplary embodiment.

Referring to FIGS. 7-9, first laser emitter 112 and second laser emitter 116 are each coupled to platform 122, such as rigidly coupled. In various embodiments, platform 122 includes aperture 124. Laser level 110 includes motor 174, a first arm 176 coupled to the first motor 174, and a first spring 177 coupled to the first arm 176, and the first spring 177 is received in the aperture 124. To rotate first laser emitter 112 and second laser emitter 116 about rotational axis 170, such as in direction 172, motor 174 exerts a force on platform 122.

Motor 174 exerts on a force on arm 175 along axis 178 extending from motor 174 to rotate platform 122 about rotational axis 170 with respect to base 126. Arm 175 exerts a force on arm 176, and that force is translated into a biasing element, shown as spring 177, which is engaged within aperture 124 of platform 122. Spring 177 is configured to engage with opposing sides of aperture 124 of platform 122, thereby reducing and/or minimizing slop and/or movement of motor 174 not being translated into movement of platform 122.

Base 126 includes a protrusion, shown as internal spring-loaded ball 136, extending from base 126, that is spring-biased against platform 122, and one or more protrusions, shown as balls 142, extending from base 126 that are spring-biased against platform 122. Spring-loaded ball 136 is configured to exert a force on platform 122 in direction 140. As a result of the force from spring-loaded ball 136, platform 122 engages against peripheral balls 142. As will be explained, the engagement between platform 122 and balls 136 and 142 reduces an amount that platform 122 moves in a direction orthogonal to rotational axis 170 while platform 122 is being rotated about rotational axis 170.

Figure 10:
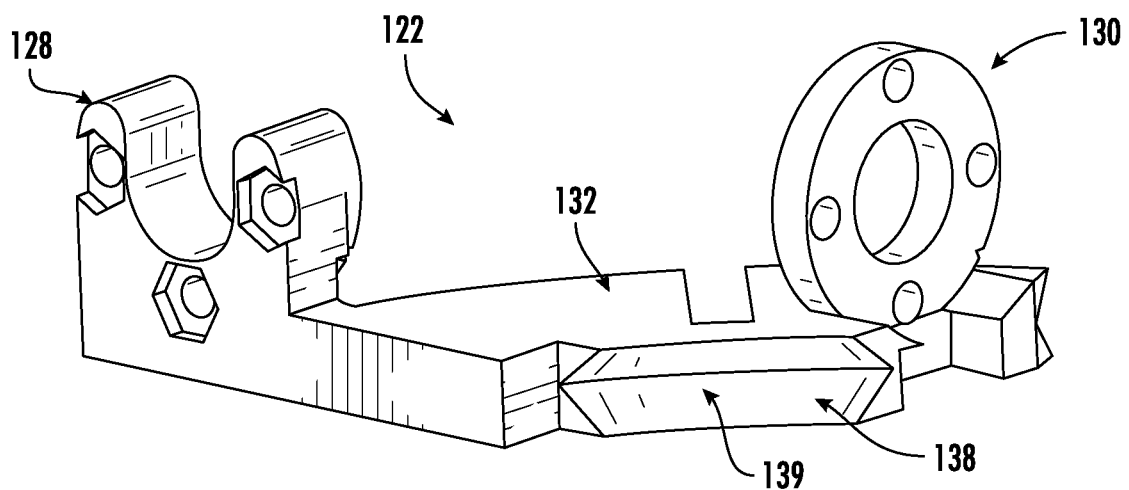
FIG. 10 is a perspective view of the platform of the laser level of FIG. 1, according to an exemplary embodiment.
Figure 11:
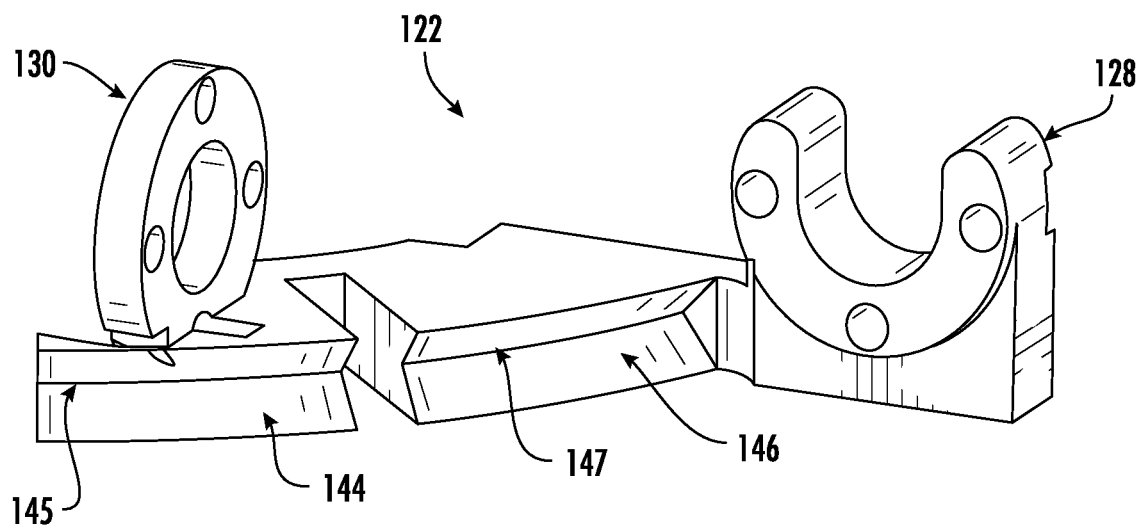
FIG. 11 is a perspective view of the platform of the laser level of FIG. 1, according to an exemplary embodiment.

Referring to FIGS. 10-11, various aspects of platform 122 are shown. In particular, platform 122 includes body 132 extending between coupler 128 and coupler 130. First laser emitter 112 is coupled to coupler 128, and second laser emitter 116 is coupled to coupler 130.

Balls 136 and 142 engage against surfaces of platform 122 to reduce and/or minimize platform 122 moving up or down from the perspective of FIGS. 10-11. In particular, balls 136, 142 engage within recesses 139, 145, and/or 147 to reduce and/or minimize the vertical movement of platform 122 while platform 122 is being rotated about rotational axis 170.

Platform 122 includes interior recessed surface 138 and opposing exterior recessed surfaces 144, 146. Interior recessed surface 138 includes a recess 139, such as a centrally located recessed portion, that extends along a length of interior recessed surface 138. Exterior recessed surface 144 includes a recess 145, such as a centrally located recessed portion, that extends along a length of exterior recessed surface 144, and exterior recessed surface 146 includes a recess 147, such as a centrally located recessed portion, that extends along a length of exterior recessed surface 146.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A laser generating device comprising:
a housing;
an arm pivotally coupled to the housing;
a platform coupled to the arm, the platform configured to be rotated with respect to the housing about both a first rotational axis and a second rotational axis distinct from the first rotational axis;
a first laser emitting device coupled to the platform, the first laser emitting device operable to generate a first output beam along a first plane;
a second laser emitting device coupled to the platform, the second laser emitting device operable to generate a second output beam along a second plane;
a first motor configured to exert a first force on the platform along a first axis; and
a second motor configured to exert a second force on the platform along a second axis distinct from the first axis;
wherein both the first motor and the second motor are activated to exert force on the platform when the platform is rotated with respect to the housing about the first rotational axis, and wherein both the first motor and the second motor are activated to exert force on the platform when the laser generating device rotates the platform with respect to the housing about the second rotational axis.

2. The laser generating device of claim 1, wherein the first rotational axis and the second rotational axis are not planar with respect to each other.

3. The laser generating device of claim 2, wherein the first motor and the second motor are coupled to the platform such that an intersecting axis intersects each of the first rotational axis and the second rotational axis and the intersecting axis is perpendicular to each of the first rotational axis and the second rotational axis, wherein the intersecting axis and the first rotational axis define a third plane that is perpendicular to the second rotational axis, and the intersecting axis and second rotational axis define a fourth plane that is perpendicular to the first rotational axis.

4. The laser generating device of claim 3, wherein the intersecting axis is parallel to the first plane.

5. The laser generating device of claim 3, wherein the intersecting axis is parallel to each of the first plane and the second plane.

6. The laser generating device of claim 1, wherein the first motor and the second motor are coupled to the platform such that an intersecting axis intersects each of the first rotational axis and the second rotational axis and the intersecting axis is perpendicular to each of the first rotational axis and the second rotational axis, wherein the intersecting axis and the first rotational axis define a third plane that is perpendicular to the second rotational axis, and the intersecting axis and the second rotational axis define a fourth plane that is perpendicular to the first rotational axis.

7. The laser generating device of claim 6, wherein the intersecting axis is parallel to each of the first plane and the second plane.

8. The laser generating device of claim 1, comprising a base, the platform coupled to the arm via the base, the base and the platform are configured to be rotated with respect to the housing about both the first rotational axis and the second rotational axis by the first motor and the second motor, wherein the platform rotates with respect to the base about a third rotational axis.

9. The laser generating device of claim 8, wherein the first plane and the second plane each include the entire third rotational axis.

10. The laser generating device of claim 9, wherein rotating the platform with respect to the housing around the first rotational axis comprises the first motor exerting a force on the platform in a first direction along the first axis, and rotating the platform with respect to the housing around the second rotational axis comprises the first motor exerting a force on the platform in a second direction along the first axis opposite the first direction.

11. The laser generating device of claim 10, wherein rotating the platform with respect to the housing around the first rotational axis comprises the second motor exerting a force on the platform in a third direction along the second axis, and rotating the platform with respect to the housing around the second rotational axis comprises the second motor exerting a force on the platform in the third direction along the second axis.

12. The laser generating device of claim 8, wherein rotating the platform with respect to the housing around the first rotational axis comprises the second motor exerting a force on the platform in a third direction along the second axis, and rotating the platform with respect to the housing around the second rotational axis comprises the second motor exerting a force on the platform in the third direction along the second axis.

13. The laser generating device of claim 1, wherein the first axis and the second axis are parallel to each other.

14. A laser generating device comprising:
a housing;
an arm pivotally coupled to the housing;
a platform coupled to the arm, the platform configured to be rotated with respect to the housing about both a first rotational axis and a second rotational axis distinct from the first rotational axis;
a first laser emitting device coupled to the platform, the first laser emitting device operable to generate a first output beam along a first plane;
a second laser emitting device coupled to the platform, the second laser emitting device operable to generate a second output beam along a second plane; and
a first motor configured to exert a first force on the platform along a first axis;
wherein rotating the platform with respect to the housing around the first rotational axis comprises the first motor exerting a force on the platform in a first direction along the first axis, and rotating the platform with respect to the housing around the second rotational axis comprises the first motor exerting a force on the platform in a second direction along the first axis opposite the first direction.

15. The laser generating device of claim 14, wherein the first rotational axis and the second rotational axis are not planar with respect to each other, wherein the first motor is coupled to the platform such that an intersecting axis intersects each of the first rotational axis and the second rotational axis and the intersecting axis is perpendicular to each of the first rotational axis and the second rotational axis, wherein the intersecting axis and the first rotational axis define a third plane that is perpendicular to the second rotational axis, and the intersecting axis and second rotational axis define a fourth plane that is perpendicular to the first rotational axis.

16. The laser generating device of claim 15, wherein the intersecting axis is parallel to each of the first plane and the second plane.

17. The laser generating device of claim 14, comprising a second motor configured to exert a second force on the platform along a second axis distinct from the first axis, wherein rotating the platform with respect to the housing around the first rotational axis comprises the second motor exerting a force on the platform in a third direction along the second axis, and rotating the platform with respect to the housing around the second rotational axis comprises the second motor exerting a force on the platform in the third direction along the second axis.

18. A laser generating device comprising:
a housing;
an arm pivotally coupled to the housing;
a base coupled to the arm such that the base rotates with respect to the housing about both a first rotational axis and a second rotational axis distinct from the first rotational axis, the base including a first protrusion and a second protrusion;
a platform coupled to the base, the platform rotatable with respect to the base about a third rotational axis, the first rotational axis extending parallel to an X-axis in a Cartesian Coordinate System, the second rotational axis extending parallel to an Y-axis in the Cartesian Coordinate System, and the third rotational axis extending parallel to a Z-axis in the Cartesian Coordinate System, the platform comprising an interior recessed surface and an opposing exterior recessed surface, wherein when the platform is rotating with respect to the base about the first rotational axis the interior recessed surface interfaces with and moves with respect to the first protrusion and the exterior recessed surface interfaces with and moves with respect to the second protrusion;
a first laser emitting device coupled to the platform, the first laser emitting device operable to generate a first output beam along a first plane; and
a second laser emitting device, the second laser emitting device operable to generate a second output beam along a second plane.

19. The laser generating device of claim 18, the platform defining an aperture, the laser generating device comprising a first motor, a first arm coupled to the first motor, and a first spring coupled to the first arm, wherein the first spring is received in the aperture, and wherein the first motor exerts a force along a first axis to rotate the platform about the third rotational axis with respect to the base.

20. The laser generating device of claim 18, the first protrusion comprising a first ball that is spring-biased against the platform, the second protrusion comprising a second ball that is spring-biased against the platform.

* * * * *